United States Patent [19]

Stearns

[11] Patent Number: 5,231,601

[45] Date of Patent: Jul. 27, 1993

[54] DIGITAL MULTIPLIER BASED UPON A REGULARLY STRUCTURED SUM OF PRODUCTS ADDER ARRAY FOR PARTIAL PRODUCT REDUCTION

[75] Inventor: Charles C. Stearns, Palo Alto, Calif.

[73] Assignee: LSI Logic Corporation, Milpitas, Calif.

[21] Appl. No.: 827,576

[22] Filed: Jan. 28, 1992

Related U.S. Application Data

[63] Continuation of Ser. No. 597,789, Oct. 15, 1990, abandoned.

[51] Int. Cl.$^5$ ............................................. G06F 7/52
[52] U.S. Cl. .................................................. 364/757
[58] Field of Search ................ 364/757, 758, 754, 749

[56] References Cited

U.S. PATENT DOCUMENTS

| | | | |
|---|---|---|---|
| 4,130,877 | 12/1978 | Riekers | 364/758 |
| 4,293,922 | 10/1981 | David et al. | 364/757 |
| 4,752,905 | 6/1988 | Nakagawa et al. | 364/757 |
| 4,852,037 | 7/1989 | Aoki | 364/758 |
| 4,910,700 | 3/1990 | Hartley et al. | 364/754 |
| 4,939,687 | 7/1990 | Hartley et al. | 364/757 |

OTHER PUBLICATIONS

Stearns et al., "Yet Another Multiplier Architecture", Proceedings of the IEEE 1990, Custom Integrated Circuits Conference, May 13-16, 1990, pp. 24.6.1-24.6.4.

Roberts et al., "A 2.5 nS ECL 16×16 Multiplier", Proceedings of the IEEE 1990 Custom Integrated Circuits Conference, May 13-16, 1990, p. 24.7.1.

*Primary Examiner*—Long T. Nguyen
*Attorney, Agent, or Firm*—Gerald E. Linden; Michael D. Rostoker

[57] ABSTRACT

A digital multiplier is configured from a number of identical circuit "slices" with interconnecting signals arranged such that the need for large wiring channels is eliminated. The resulting multiplier, a hybrid of tree and array multipliers, has many of the space saving characteristics of array multipliers, with many of the speed advantages of tree multipliers. Various parameters of the design are flexible and may be changed by the designer to make speed versus size tradeoffs. The multiplier may be either pipelined or non-pipelined.

1 Claim, 5 Drawing Sheets

DIGITAL MULTIPLIER BASED UPON A REGULARLY STRUCTURED SUM OF PRODUCTS ADDER ARRAY FOR PARTIAL PRODUCT REDUCTION

This application is a continuation of U.S. patent application Ser. No. 07/597,789 filed on Oct. 15, 1990, now abandoned.

CROSS-REFERENCE TO RELATED APPLICATIONS

Attention is directed to commonly-owned, copending U.S. patent application No. 07/479,933, entitled WEIGHTED-DELAY COLUMN ADDER AND METHOD OF ORGANIZING SAME and filed on Feb. 14, 1990 by Chang and Werner said application Ser. No. 07/479,933 corresponds to U.S. Pat. No. 5,161,119.

TECHNICAL FIELD OF THE INVENTION

The present invention relates to the sum-of-products portion of digital multipliers and multiplier-adders, such as might otherwise (i.e., without the present invention) be embodied in a "Wallace Tree" structure, an array structure, or other similar structure, whether pipelined or non-pipelined.

BACKGROUND OF THE INVENTION

The digital multiplier has become a standard feature of modern microcomputer systems and is a critical component in modern array processors and digital signal processors. Designs of these digital multipliers are based upon two basic elements: a) generation of partial products, and b) the sum-of-products reduction of the partial products to arrive at an end result. This sum-of-products reduction process has been approached in many different ways in different multiplier designs and architectures.

The basic element of the first step of multiplication is the partial product generator. A partial product generator is actually itself a multiplier, but one which can only multiply small numbers. Taking advantage of the fact that the inputs which are to be multiplied together may each be expressed as a sum of smaller numbers, we then use the relationship:

$$(A+B+C)(a+b+c) = Aa+Ab+Ac+Ba+Bb+Bc+Ca+Cb+Cc$$

Each of the components of the result (i.e., Aa, Ab, Ac, Ba, Bb, etc.) is called a partial product. One scheme of multiplying two binary numbers together is to view each binary input number as the sum of its component binary weighted bits. For example, the binary number 10110 (decimal 22) may be viewed as $1 \times 2^4 + 0 \times 2^3 + 1 \times 2^2 + 1 \times 2^1 + 0 \times 2^0$. Each of these component numbers corresponds to the contribution of one of the binary number's bits to its total value. Other schemes have also been used which break up the binary number into components of more than one bit or which analyze the contributions of several different bit pairs to the same binary weighted result. For example, groups of two or more bits could be analyzed at a time and "encoded" or multiplied into partial products having a larger scope. The advantage of using a larger number of bits is that fewer partial products are generated because of the more intensive up-front reduction, requiring less sum-of-products addition to arrive at the result. The increased size and lower speed of partial product generators encompassing more bits must be weighed against the size and speed of the resulting sum-of-products addition network before an appropriate method of partial products generation is chosen.

The simplest form of partial product generation is known as "AND" gate masking. The "AND gate may be viewed as a one bit by one bit multiplier which generates a one bit result. For "AND" gate masking, the input numbers (multiplicands) are broken up into one-bit components. Another form of partial product generation well known in the art is called Booth encoding. This method generates partial products by logically analyzing more than one combination of bits at a time using a broader scope of operation and resulting in fewer partial products. In the current state of the art, there are numerous schemes for partial product generation, any of which may be applied to the present invention.

Digital multipliers typically fall into one of two categories — "array" multipliers and "tree" multipliers — the topology and characteristics of which are both well known in the current state of the art. The terms "array" and "tree" refer to the organization of that part of the multiplier which reduces (i.e., adds up) the partial products to arrive at an end result (i.e., the numerical product of the two multiplicands). These partial products are the result of the first stage of these multipliers, which actually performs the multiplication in many small pieces.

The complexities encountered in the design of parallel adders suitable for the sum-of-products application in parallel multipliers led to the development of the "Wallace Tree". Simply stated, the Wallace Tree is a logical connection of full adders (also referred to as carry save adders) which can be simply replicated and interconnected to perform the sum of products calculation. An example of a Wallace Tree is the type SN54LS275 4-bit-by-4-bit binary multiplier with 3-state outputs, 7-bit slice Wallace Tree with 3-state outputs from Texas Instruments.

"Array" multipliers are formed by the use of arrays of full adders arranged in rows such that each row of adders reduces one further partial product. Because all intermediate partial products are maintained in full parallel carry-save form, carries do not propagate (ripple). As such, the delay of the sum-of products adder array is independent of partial product width, and is dependent only upon the depth of the array. Although each row may be extremely fast, they do not make efficient use of their hardware resources, since each row of adders is used only once in any given multiplication and remains idle while its intermediate result propagates through the rest of the array. It is possible to pipeline the rows so that hardware efficiency may be improved by allowing several multiplications to be overlapped. This also improves the throughput of the resultant multiplier, but increases the overall amount of hardware required and increases the delay (latency) from input to result by the additional delay of the pipeline registers and the number of clocks required to propagate the result to the output. Generally, these constraints also apply to "tree" multipliers.

It is also possible to build iterative structures whereby pipeline registers may be employed to re-use the same row of adders iteratively. In such a structure, the amount of hardware is greatly reduced, but the latency is increased by the delays associated with the pipeline register and throughput is greatly reduced. Generally, array adders are implemented as small, but relatively slow structures. Their depth tends to be linearly proportional to the number of partial products.

Tree adders, such as the Wallace tree, are organized to reduce partial products faster than arrays. Their organization is such that the depth of the tree structure tends to be proportional to the log (base 1.5, since full adders are 3/2 adders) of the number of partial products. As such, the number of adders required is considerably fewer than for a conventional array adder. One major problem, however, has been the layout of tree adders. The tree wants to add as many partial products together that are available at any given time. Unfortunately, the bits that are ready to be summed are usually not in physical proximity with one another. As a result, the apparent savings due to fewer rows is usually lost in the cumbersome interconnections required to implement the rows. This makes the layout of tree adders extremely cumbersome and highly irregular, requiring very large wiring channels when implemented on integrated circuits. In fact, the large wiring channels and interconnect density make tree adders considerably larger than conventional arrays, even though it might appear on the surface that they would require fewer active components.

Another inherent feature of tree adders is that they do not physically lay out (in a semiconductor device) in a rectangular block. The shape of the typical tree adder is that of a parallelogram. Unfortunately, this wastes a great deal of space and causes poor chip area utilization.

FIGS. 1a and 1b contrast the topology of the conventional array with that of the tree. In FIG. 1a, an array adder 100 adds up four equally weighted inputs 102a, 102b, 102c, and 102d to arrive at an output 104. This requires four identical "rows" (or "stages") 106, 108, 110 and 112 of adders 130a, 130b, 130c and 130d. In FIG. 1b, a tree adder 120 adds up the same four equally weighted inputs 102a, 102b, 102c and 102d to arrive at a result 122, but is organized in only two non-identical "rows" 124 and 126. In like manner to the diagram of FIG. 1a, each row is made up of adders 130e, 130f and 130g. (Both of the examples of FIGS. 1a and 1b are greatly simplified by ignoring the effects of "carries in" and "carries out".)

Only rarely does a designer encounter exactly the same multiplier requirements twice. Different applications pose different requirements on multiplicand width, available space, and speed. As a result, designs must be usually done from scratch, requiring a great deal of manual effort. It would therefore be extremely desirable to have a single multiplier architecture which allows for a very regular layout, and which can be adapted readily for different speed/size tradeoffs.

DISCLOSURE OF THE INVENTION

It is therefore an object of the invention to provide a technique for improving the space versus speed performance of the sum-of-products section of multipliers.

It is a further object of the invention to provide a sum-of-products adder with a very regular structure.

It is a further object of the invention to provide a sum-of-products adder which adapts readily to a rectangular layout.

It is a further object of the invention to provide a sum-of-products architecture which can readily be adapted for different size/speed tradeoffs without sacrificing the other advantages of the invention.

According to the invention, a digital multiplier is configured from a number of identical circuit "slices" with interconnecting signals arranged such that the need for large wiring channels is eliminated. The resulting multiplier, a hybrid of tree and array multipliers, has many of the space saving characteristics of array multipliers, with many of the speed advantages of tree multipliers. Various parameters of the design are flexible and may be changed by the designer to make speed versus size tradeoffs. The multiplier may be either pipelined or non-pipelined.

The sum-of-products adder of the present invention is neither a "tree" nor an "array", but is rather somewhat of a hybrid of the two concepts, combining the speed of a tree with the density of the array. The adder array is broken up into a number of "slices" which form building blocks for the array. Each slice takes in two addends, generates partial products, and reduces the addends and the partial products into a sum and a carry out. Carries-in are accepted from the neighboring slice of lower binary weight and carries-out are propagated to the neighboring slice of higher binary weight.

Partial product generation is actually accomplished within each of the slices, and may be accomplished by Booth encoding, simple "AND" masking, or any other suitable technique. As such, the partial product generation is not detailed herein, as these methods are well known in the current state of the art.

What makes the architecture flexible is that the slice may generate any number of partial products depending upon design requirements. This is accomplished by extending the basic architecture and increasing the size of the slice. The more partial products generated per slice, the faster and larger the adder and the resultant multiplier.

In general, each slice adds up as many partial products as possible in parallel, and then ripple adds the addends, which are assumed to arrive after all of the partial products have been reduced. This is a reasonable assumption, since the partial products are the first items computed, and intermediate products are the source of the addends. The larger the slice, that is, the more partial product generators incorporated into each slice, the more the architecture behaves like a tree multiplier, and the smaller the slice, the more it behaves like an array multiplier.

The slices are intended to be laid out in a symmetrical fashion, and are laid out in a semiconductor device in such a symmetrical pattern, such that the carries out from each slice physically line up (preferably exactly) with the carries in from the neighboring slice in the same row, and such that the sum and carry out physically line up (preferably exactly) with the addend inputs of the slice in the neighboring row. This eliminates the need for wiring channels and elaborate interconnect schemes, and permits densities approaching those available for array multipliers while retaining many of the speed advantages of tree multipliers.

The delay characteristics of such a multiplier, configured according to the present invention, may be given by:

$$\Delta T_1 = \log_{1.5}(\text{\# of partial products per slice})$$

The propagation delay through the array of slices is given by:

$$\Delta T_1 = 2 \cdot \left[ \frac{\text{(total number of partial products)}}{\text{(\# of partial products per slice)}} \right] - 2$$

This makes the total propagation delation through the multiplier:

$$TotalPropDelay = \Delta T_1 + \Delta T_2$$

where all delays are expressed in units of adder delays.

Other objects, features and advantages of the invention will become evident in light of the following description thereof.

DETAILED DESCRIPTION OF THE INVENTION

The invention relates to a novel arrangement of novel "slices" to form a digital multiplier.

Figure 1A:
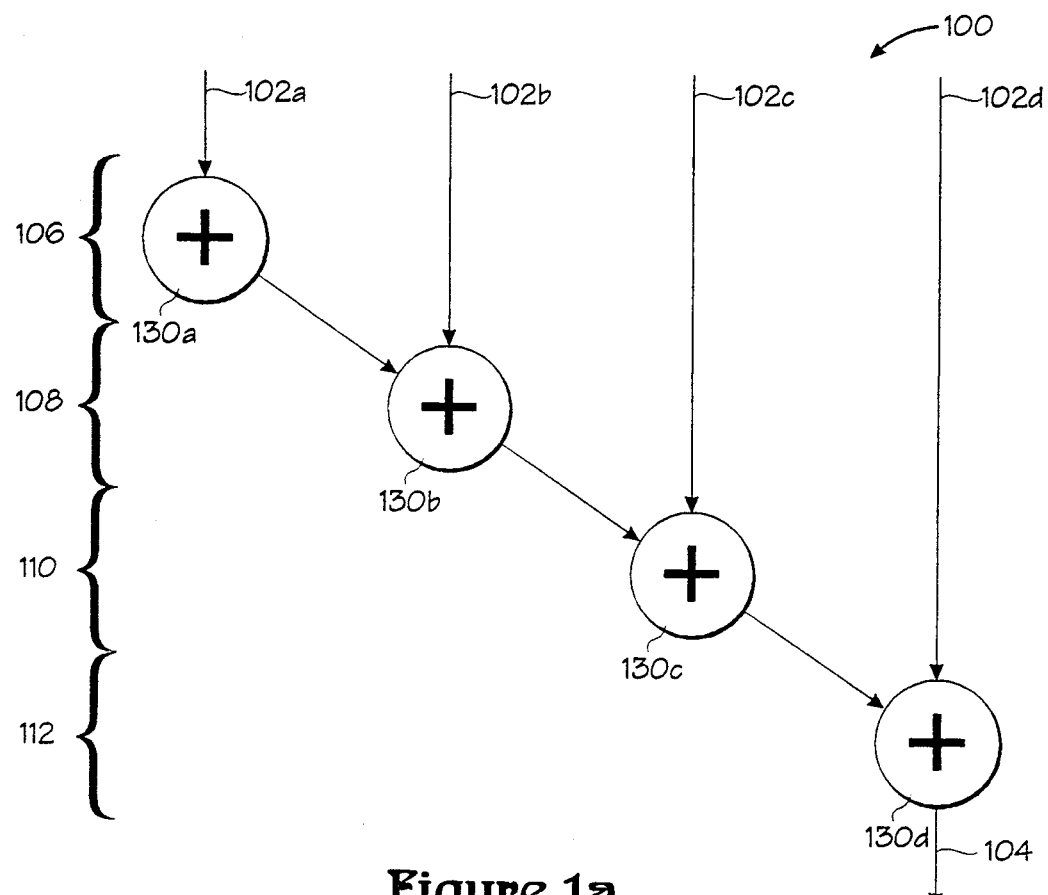
FIG. 1a is a simplified block diagram illustrating the structure of a typical array adder.
Figure 1B:
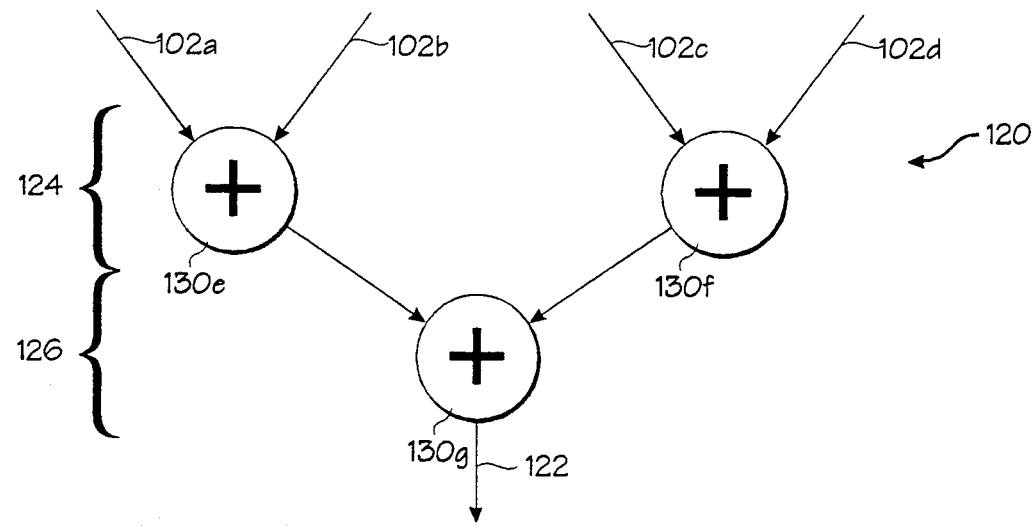
FIG. 1b is a simplified block diagram illustrating the structure of a typical tree adder.
Figure 2:
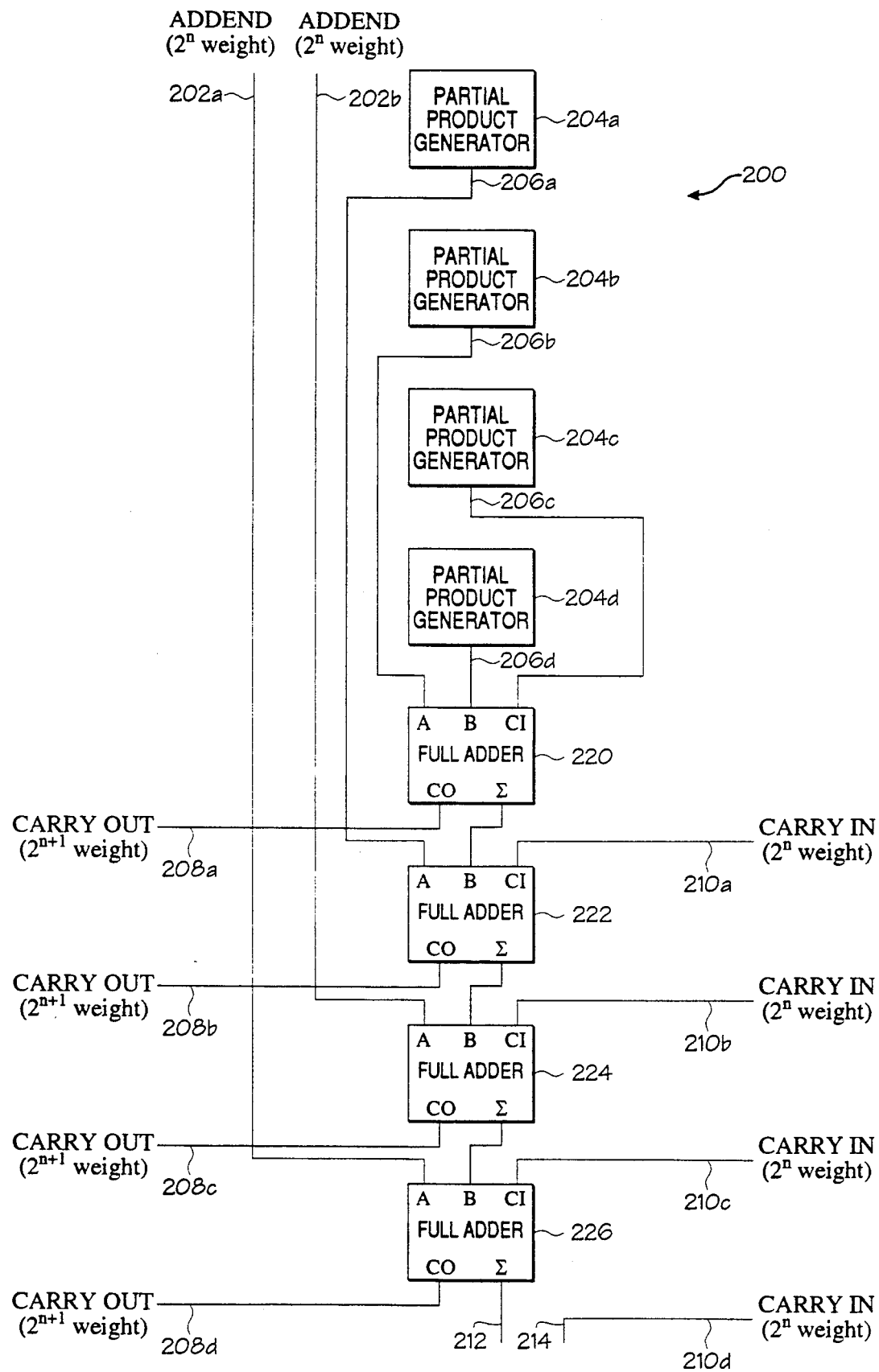
FIG. 2 is a block diagram of an adder "slice" as it relates to the present invention.

FIG. 2 shows an implementation of a representative "slice" 200 wherein four partial products 206 are generated by four partial product generators 204. Partial products 206a, 206b, 206c and 206d from partial product generators 204a, 204b, 204c and 204d are summed together with two addends 202a and 202b and four (carry-ins) 210 by four adders 220, 222, 224, and 226. (The four adders 220, 222, 224 and 226 form an "adder chain".) The layout of the slice 200 is such that the partial products are added together first, as high in the adder chain as possible. The carries-in are input to the adder chain at the "rate" of one carry-in per adder below that point, with the exception that one of the carries-in is passed through (bypasses) the adder chain as a partial result 214. In the implementation of FIG. 2, the carries-in 210a, 210b, 210c and 210d are connected one each to adders 222, 224 and 226. The last adder in the chain 226 produces an intermediate sum (partial product) 212. Addends 202a and 202b will always be ripple added in the last two adders (bottom two) of the adder chain regardless of the size of the slice. This matches delays best and minimizes the effect of ripple carries. Carries-out (carry-outs) 208a, 208b, 208c and 208d of the adders 220, 222, 224 and 226, respectively, are illustrated in FIG. 2.

It should be noted, for illustrative clarity, that the actual multiplicand inputs are not shown, since they are part of the partial product generation and ma be considered to be buried within the partial product generators 204a, 204b, 204c and 204d.

Figure 3:
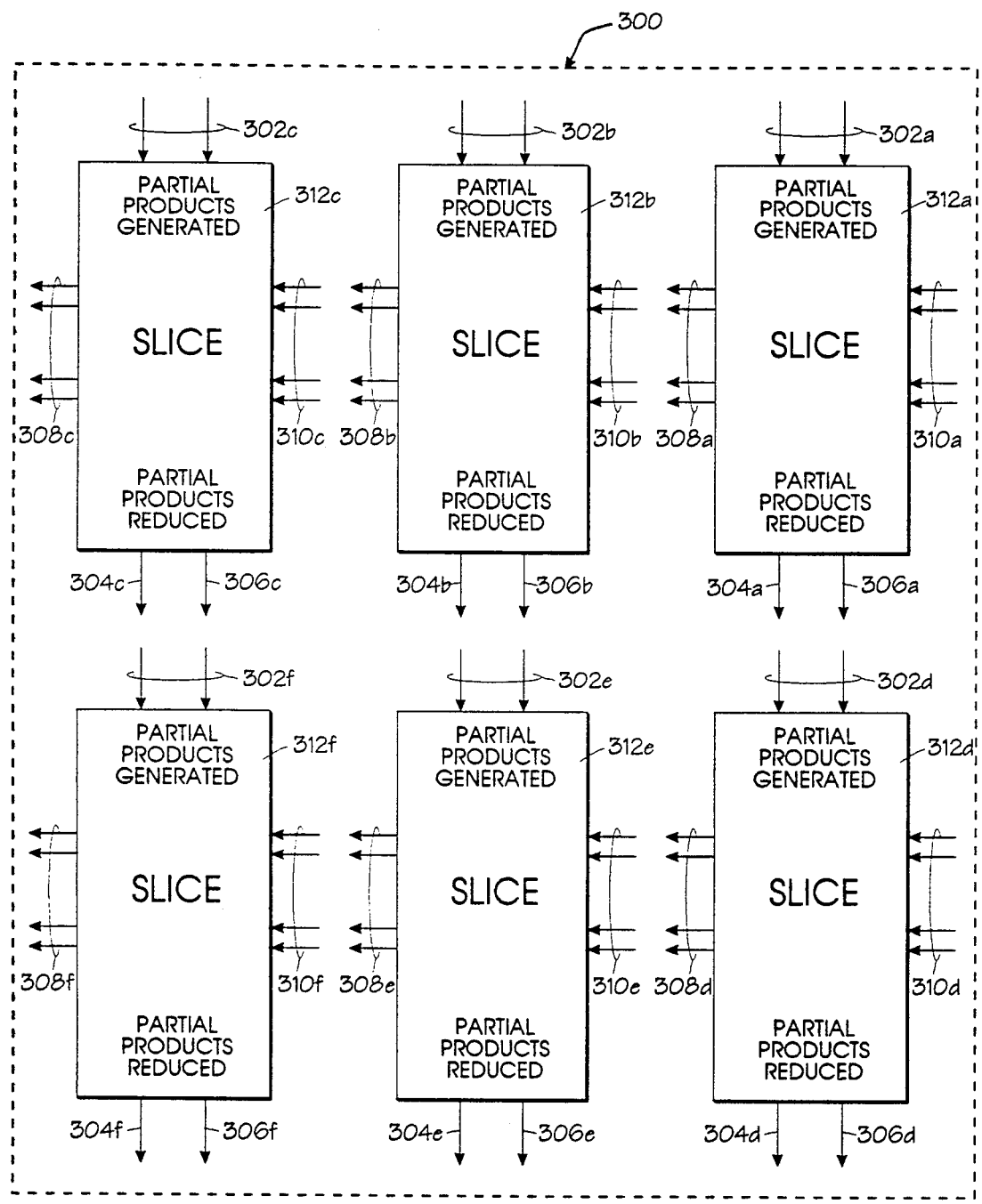
FIG. 3 is a block diagram illustrating the connectivity and architecture of a regular sum-of-products adder based upon the "slices" of FIG. 2.

FIG. 3 shows a complete two-row sum-of-products adder as a rectangular array 300 of slices 312a, 312b, 312c, 312d, 312e and 312f each of the slices being similar to element 200 of FIG. 2, as required to process all of the partial products. The slices are arranged such that outputs 304a, 304b, 304c, 304d, 304e and 304f and 306a, 306b, 306c, 306d, 306e and 306f of each slice physically line up (preferably exactly) with addend inputs in the next row, and are connected thereto. For example, the outputs 304a and 306a line up with the addend inputs 302d of the next row, the outputs 304b and 306b line up with the addend inputs 302e of the next row, and the outputs 304c and 306c line up with the addend inputs 302f of the next row. The outputs 304d, 304e, 304f, 306d, 306e and 306f line up with addend inputs of the next row (not shown), if there is such a next row. The inputs 302a, 302b and 302c line up with the outputs of the previous row (not shown), if there is such a previous row. These connections are repeated in like fashion until the last row, where a ripple-carry adder is used to reduce the final results to a binary product of the two input multiplicands. Sum output 304a, 304b, 304c, 304d, 304e and 304f of each slice 312a, 312b, 312c, 312d, 312e and 312f, respectively corresponds to the sum output 212 with respect to the slice of FIG. 2. Carry output 306a, 306b, 306c, 306d, 306e and 306f of each slice 312a, 312b, 312c, 312d, 312e and 312f, respectively with respect to FIG. 3 corresponds to the carry output 214 with respect to the slice of FIG. 2. Any number of slices 312a . . . 312n can be used in the array 300.

Again with respect to FIG. 3, the slices 312a, 312b, 312c, 312d, 312e and 312f are further laid out and arranged such that carries-out 308a, 308b, 308c, 308d, 308e and 308f from each slice physically line up (preferably exactly) with the carries-in (carry-ins) 310a, 310b, 310c, 310d, 310e, 310f from the neighboring slice in the same row and are connected thereto. Carry connections are made in like fashion for all slices in the row. For example, the carry-outs 308a connect to the carry-ins 310b, the carry-outs 308b connect to the carry-ins 310c, the carry-outs 308d connect to the carry-ins 310e, and the carry-outs 308e connect to the carry-ins 310f.

Since ripple-carry adders and their use in the final stage of multipliers is well known in the current state of the art, they are not illustrated or discussed in detail herein, as any ripple-carry adder will serve to perform the final step.

While only two 3-slice wide rows are illustrated in FIG. 3, a greater number of rows and wider rows (more slices per row) are readily implemented using the described methodology.

A larger slice can be generated with more partial products per slice simply by increasing the number of partial product generators (e.g. 206a, 206b, 206c and 206d of FIG. 2), and correspondingly increasing the number of adders (i.e. the length of the adder chain). Because of the 3 to 2 reduction nature of the full adders used here, (that is 3 inputs at the same binary weight reduce to two binary outputs of different binary weight) the increase in the number of adders required will be proportional to the logarithm to the base 1.5 of the number of partial products per slice. By increasing the number of partial product generators per slice, the total number of partial products in the adder array is left unchanged, but fewer total slices will be required, and the net result is that higher speed may be attained at the cost of greater size. Choice of this parameter (number of partial products per slice) is left to the designer based upon specific application requirements.

In any given implementation, the rows can be pipelined, that is, latches and registers may be placed between the rows on the sum and carry to addend connections (e.g., the 304a-c and 306a-c outputs corresponding to next row input pairs 302d-f, respectively). This would serve to improve throughput, albeit at the expense of initial latency.

Ordinarily, the actual usage of slice components would take on a parallelogram shape, with many of the adders being left unused at the edges of the partial product array. However a multiplier of this architecture may be "folded" such that the overall array is rectangular and efficiently used. For this to occur, slices near the edge of the partial product array need to share adders. On these boundary cases and because the multiplier is symmetrical, the adders in one slice that are not used will be used by the folded partial products that have not been reduced.

Figure 4A:
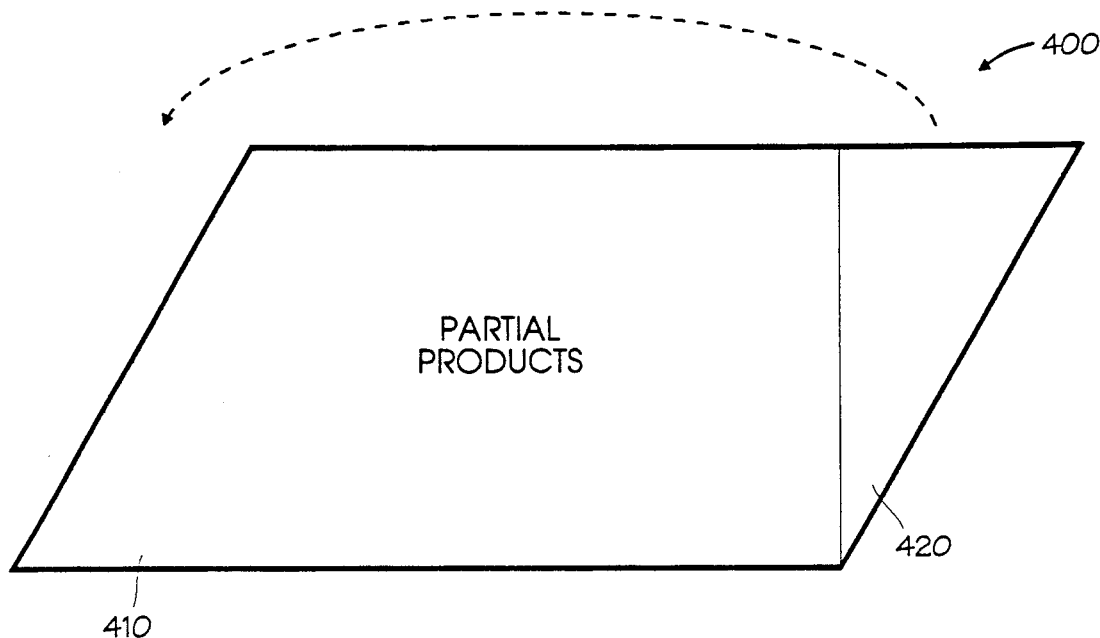
FIGS. 4a and 4b are graphic representations illustrating the concept of folding an otherwise parallelogram-shaped sum-of-products adder array into a rectangular shape.
Figure 4B:
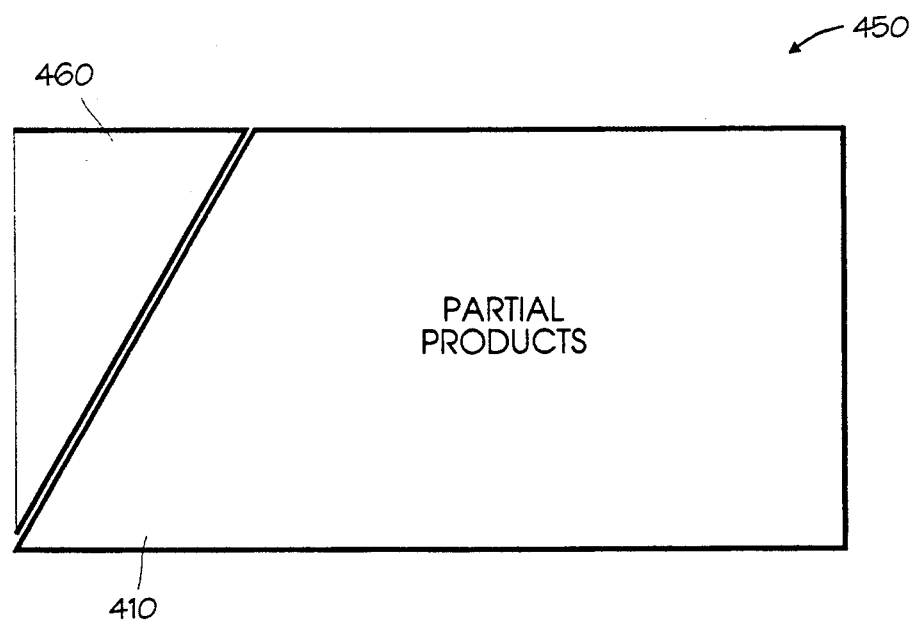

FIGS. 4a and 4b illustrate this concept of folding. FIG. 4a shows a parallelogram-shaped array 400 on which a conceptual demarcation line has been drawn dividing it into a trapezoidal section 410 and a triangular section 420. Clearly, a rectangular array of slices would have a great number of unused components in it if it were applied directly to the parallelogram, as there would be two triangular areas left unused. FIG. 4b shows an alternative layout 450 of the same partial product array as in FIG. 4a, but in this case, the triangular section 420 with respect to FIG. 4a has been moved to the new position illustrated by 460 in FIG. 4b. The trapezoidal portion 410 of the array is left unchanged, except that its connections with 460 will have to be re-routed: a small price to pay for the significant savings in space and improved utilization. The partial products of triangular section 460 will make use of adders and partial product generators which would have gone unused had the array been left parallelogram shaped. This mechanism works primarily due to the symmetrical nature of the partial products generated in N by N multipliers, which guarantees that the shape of the triangular portion 420 will fit exactly against the opposite side of trapezoidal section 410 forming a perfectly rectangular array, as illustrated in FIG. 4b.

Figure 5:
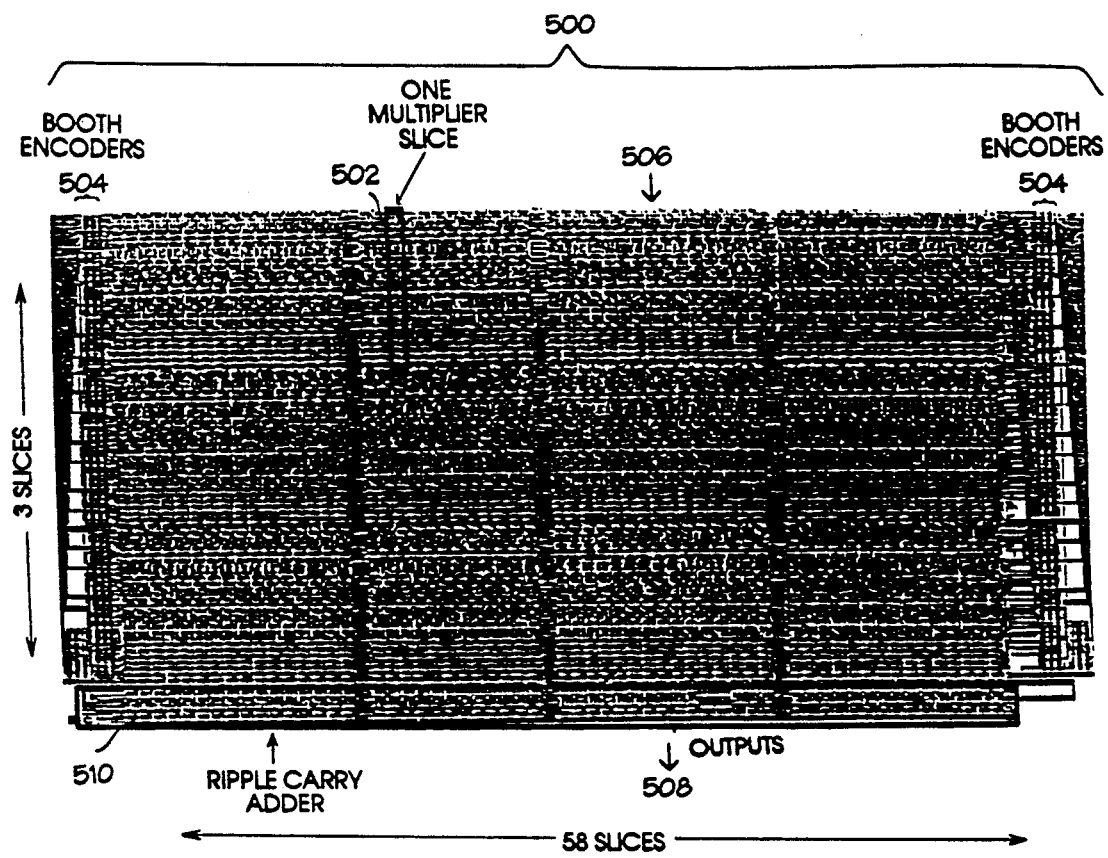
FIG. 5 is a photomicrograph of a physical implementation of a 56 by 56 multiplier making use of one instance of the sum-of-products adder of the present invention.

FIG. 5 is a photomicrograph of an implementation of a 56 by 56 multiplier 500 using the sum-of products array of the present invention, where the number of partial products per slice is 9, the partial products are generated by modified Booth encoding, and the addend bit width is 112 bits. The slices are arranged as three rows of fifty-eight slices. The layout is characterized by Booth encoders 504 along the extreme left and right hand edges of the array. A typical slice 502 is indicated on the diagram. Multiplier inputs 506 enter at the top of the array, and product outputs 508 exit at the bottom. A final stage ripple-carry adder 510 is also indicated on the photomicrograph.

What is claimed is:

1. Method of multiplying an input multiplicand and an input multiplier together and producing their binary product comprising:
   providing a parallelogram-shaped array of rows of interconnected slices and a final stage ripple-carry adder, each of said slices configured as follows:
   providing a plurality of partial product generators generating partial product signals;
   providing a plurality of adders arranged in an adder chain;
   providing two addend input lines;
   providing a sum output line;
   providing a carry output line;
   providing a plurality of previous-stage carry input lines; and
   providing a plurality of next-stage carry output lines of number equal to that of the previous-stage carry input lines;
   producing partial product signals within any given slice of the same binary weight;
   providing a sum output signal on said sum output line, a carry-out signal on said carry output line, addend input signals on said addend input lines and carry-in signals on said previous-stage carry input lines at the same binary weight as that of the generated partial product signals;
   providing carry-out signals on the next-stage carry output lines having a binary weight one binary order higher than that of the generated partial product signals;
   arranging said adders such that as many partial product signals as possible are added in parallel and such that each adder used to combine partial product signals generates a sum output signal and a carry-out signal on a next-stage carry output line, and other of the adders are serially connected, each subsequent adder except the final two adders receiving a carry-in signal on one previous-stage carry input line, one partial product signal, and the sum output signal of the previous adder in the chain and generating one sum output signal and a carry-out signal on one next-stage carry output line; two final adders each receiving a carry-in signal on a previous-stage carry input line, the sum output signal of the previous adder, and one of the two addend input signals, and each of the two final adders generating a sum output signal and a next-stage carry input signal, where the sum of the last of the final two adders is taken as the sum output of the slice, and where the remaining carry-in signal on the remaining previous-stage carry input line is provided as a carry-out signal on the carry output line of the slice; and
   arranging said rows of slices in order of binary weight, wherein the same order of binary weight applies to all rows;
   physically lining up the rows such that the sum and carry output lies of each slice in any given row connect directly to the addend input lines of each slice of the same binary weight in the next row; and
   adding the sum and carry output signals of the final row of slices in a ripple-carry adder, the output of which is the binary product of an input multiplicand signal and an input multiplier signal.

* * * * *